(12) United States Patent
Sachdev et al.

(10) Patent No.: US 10,496,935 B2
(45) Date of Patent: Dec. 3, 2019

(54) SYSTEM MODERNIZATION USING MACHINE LEARNING

(71) Applicant: Accenture Global Solutions Limited, Dublin (IE)

(72) Inventors: Ravi Sachdev, Maharashtra (IN); Pramodsing Bijani, Maharashtra (IN); Mahesh Bandkar, Maharashtra (IN); Anand Parulkar, Maharashtra (IN); Ravichandran Subramaniam, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 714 days.

(21) Appl. No.: 15/149,279

(22) Filed: May 9, 2016

(65) Prior Publication Data
US 2017/0270432 A1 Sep. 21, 2017

(30) Foreign Application Priority Data
Mar. 17, 2016 (IN) .............................. 201641009309

(51) Int. Cl.
*G06N 20/00* (2019.01)
*G06F 9/54* (2006.01)
*G06Q 10/06* (2012.01)

(52) U.S. Cl.
CPC ............. *G06N 20/00* (2019.01); *G06F 9/543* (2013.01); *G06Q 10/067* (2013.01)

(58) Field of Classification Search
CPC ...... G06F 9/543; G06Q 10/067; G06N 20/00; G06N 99/005; G06N 5/04
See application file for complete search history.

(56) References Cited

U.S. PATENT DOCUMENTS

2005/0223373 A1  10/2005  Gage et al.
2007/0245320 A1  10/2007  Cotichini et al.
(Continued)

OTHER PUBLICATIONS

Cutler et al., "Usability Testing and Workflow Analysis of the TRADOC Data Visualization Tool", Sep. 2012, Naval Postgraduate School, pp. 1-157 (Year: 2012).*

*Primary Examiner* — Kamran Afshar
*Assistant Examiner* — Brent Johnston Hoover
(74) *Attorney, Agent, or Firm* — Fish & Richardson P.C.

(57) ABSTRACT

Methods, systems, and apparatus, including computer programs encoded on a computer storage medium, for system modernization using machine learning are disclosed. In one aspect, a method includes the actions of generating training data. The actions include generating a first model, a second model, and a third model. The actions include receiving data that is related to technological capabilities of an application and data that is related to business priorities of the application. The actions include applying the first model to the data that is related to the technological capabilities of the application and the second model to the data that is related to business priorities of the application. The actions include generating a modification recommendation for the application. The actions further include providing, for output, the modification recommendation for the application. The actions include receiving feedback data that indicates a level of acceptance of the modification recommendation for the application.

18 Claims, 6 Drawing Sheets

(56) References Cited

U.S. PATENT DOCUMENTS

| | | |
|---|---|---|
| 2008/0301669 A1 | 12/2008 | Rao et al. |
| 2008/0313110 A1* | 12/2008 | Kreamer ................ G06Q 10/06 |
| | | 706/12 |
| 2011/0113377 A1 | 5/2011 | Lategan |
| 2011/0179492 A1* | 7/2011 | Markopoulou ....... G06F 21/552 |
| | | 726/25 |
| 2011/0231851 A1 | 9/2011 | Lategan |
| 2011/0270911 A1 | 11/2011 | Lategan |
| 2014/0130032 A1 | 5/2014 | Lipinski et al. |
| 2014/0201714 A1* | 7/2014 | Vaidyan .............. G06F 11/3668 |
| | | 717/124 |
| 2015/0007157 A1 | 1/2015 | Park et al. |
| 2015/0007255 A1 | 1/2015 | Kim |
| 2015/0262249 A1* | 9/2015 | Wical ................. G06Q 30/0269 |
| | | 705/14.55 |
| 2015/0309783 A1 | 10/2015 | Labana et al. |
| 2015/0347759 A1* | 12/2015 | Cabrera ................ G06F 21/577 |
| | | 726/25 |
| 2017/0031800 A1* | 2/2017 | Shani ........................ G06F 8/77 |

* cited by examiner

Technical Health Survey

| Questions | Descriptions | Not Applicable | Selectable Responses / Descriptions | | | | | Answer |
|---|---|---|---|---|---|---|---|---|
| | | | 1 - Inadequate | 2 - Constraints | 3 - Manageable | 4 - Fair | 5 - Good | |
| Architecture - Data | | | | | | | | |
| How consistently are data models utilized across applications? | Needs an explanation | Not Applicable | Each application uses a different data model | Many applications use different data models | OK, but some instances of a lack of control | Reasonably well. | Consistently used. | 2 - Constraints |
| What is the level of centralization across Sytems of Records (SOR)? | | Not Applicable | No centralization | Minimal centralization | Several, but not all, systems utilize centralization | Most Systems of Record are centralized | All Systems of Record are centralized | 3 - Manageable |
| Preferred Mode - Batch or Online? | | Not Applicable | Batch | Mostly Batch | Mostly online but some essential systems are batch | Mostly Online | Online | 2 - Constraints |
| How is data accessed across the organization? (ON demand through API, ETL requests, other?) | | Not Applicable | Batch processing every night | Most data requests require batch processing | Some batch, some online | Most data is available online | On-demand | 4 - Fair |

FIG. 3

SYSTEM MODERNIZATION USING MACHINE LEARNING

CROSS-REFERENCE TO RELATED APPLICATION

The present application claims the benefit of Indian Patent Application No. 201641009309, filed on Mar. 17, 2016, which is incorporated herein by reference.

TECHNICAL FIELD

This application generally relates to machine learning.

BACKGROUND

Machine learning is a method of data analysis that automates analytical model building. Using processes that iteratively learn from data, machine learning allows computers to find hidden insights without being explicitly programmed where to look.

SUMMARY

An entity may be using systems and applications that are out of date and need to be upgraded. For various reasons, however, the entity may be unaware that the systems and application are out of date. To identify out of date applications, the entity may provide data to three models that are trained using supervised and unsupervised machine learning. The training data for the models is based on an analysis of other systems and applications. The models process the data provided by the entity and generate recommendations regarding upgrading the systems and applications. The entity may choose to enact any of the recommendations provided. Using machine learning again, the models may be updated based on whether or not the entity accepted the recommendations.

An innovative aspect of the subject matter described in this specification may be implemented in a method that includes the actions of generating training data; based on the training data and using supervised machine learning, generating a first model, a second model, and a third model; receiving data that is related to technological capabilities of an application and data that is related to business priorities of the application; applying the first model to the data that is related to the technological capabilities of the application and the second model to the data that is related to business priorities of the application; based on applying the first model and the second model, generating a modification recommendation for the application; providing, for output, the modification recommendation for the application; receiving feedback data that indicates a level of acceptance of the modification recommendation for the application; and based on the feedback data that indicates the level of acceptance of the modification recommendation for the application, modifying, using unsupervised machine learning, the third model.

These and other implementations can each optionally include one or more of the following features. The action of generating training data includes: analyzing a plurality of applications; generating modification recommendations for each of the plurality of applications; and generating, independent of any feedback data, training data based on analyzing the plurality of applications and generating the modification recommendations for each of the plurality of applications. The actions further include determining technical debt for the application, wherein the technical debt is based on one or more of cyclomatic complexity, coupling factor, lack of cohesion of methods, attribute hiding factor, method hiding factor, lines of code, or number of classes or files. The modification recommendation for the application is further based on the technical debt for the application. The action of receiving data that is related to technological capabilities of an application and data that is related to business priorities of the application includes: providing, for output, one or more technological capabilities prompts that are configured to elicit a technical function response from a user; and providing, for output, one or more business priorities prompts that are configured to elicit a business goal response from the user. The first model is a technology capabilities model that is configured to provide recommendations based on technical functions of the application. The second model is a business priorities model that is configured to provide recommendations based on business goals of the application.

The third model is a ratings model that is configured to modify recommendations based on prior feedback. The technical capabilities of the application include elasticity, scalability, extensibility, interoperability, ease of data access, accessibility, availability, security, currency, or vendor reliance. The business goals of the application comprise time to market, omni channel, data informed decision making, compliance, greater available functionality and mash ups, capture market share, improved client experience, increase share of wallet, accelerate client onboarding, or self-service features. The actions further include: receiving data that is related to technological capabilities of an additional application and data that is related to business priorities of the additional application; applying the first model to the data that is related to the technological capabilities of the additional application and the second model to the data that is related to business priorities of the additional application; based on applying the first model and the second model, generating an additional modification recommendation for the additional application; generating an adjusted additional modification recommendation by applying the third model to the additional modification recommendation for the additional application; providing, for output, the adjusted additional modification recommendation for the additional application; receiving additional feedback data that indicates an additional level of acceptance of the adjusted additional modification recommendation for the additional application; and based on the additional feedback data that indicates the additional level of acceptance of the adjusted additional modification recommendation for the additional application, modifying, using unsupervised machine learning, the third model.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Users can receive recommendations to upgrade their systems and applications that are tailored to their preferences. The system providing the recommendations can suggest an application upgrade that improve the performance of a computing device running the application. For example, the system may suggest an application upgrade that improves the memory allocation or processor utilization of a server or client device.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3 and 4 illustrate example user interfaces for systems that perform system modernization using machine learning.

Like reference numbers and designations in the various drawings indicate like elements.

DETAILED DESCRIPTION

Figure 1:
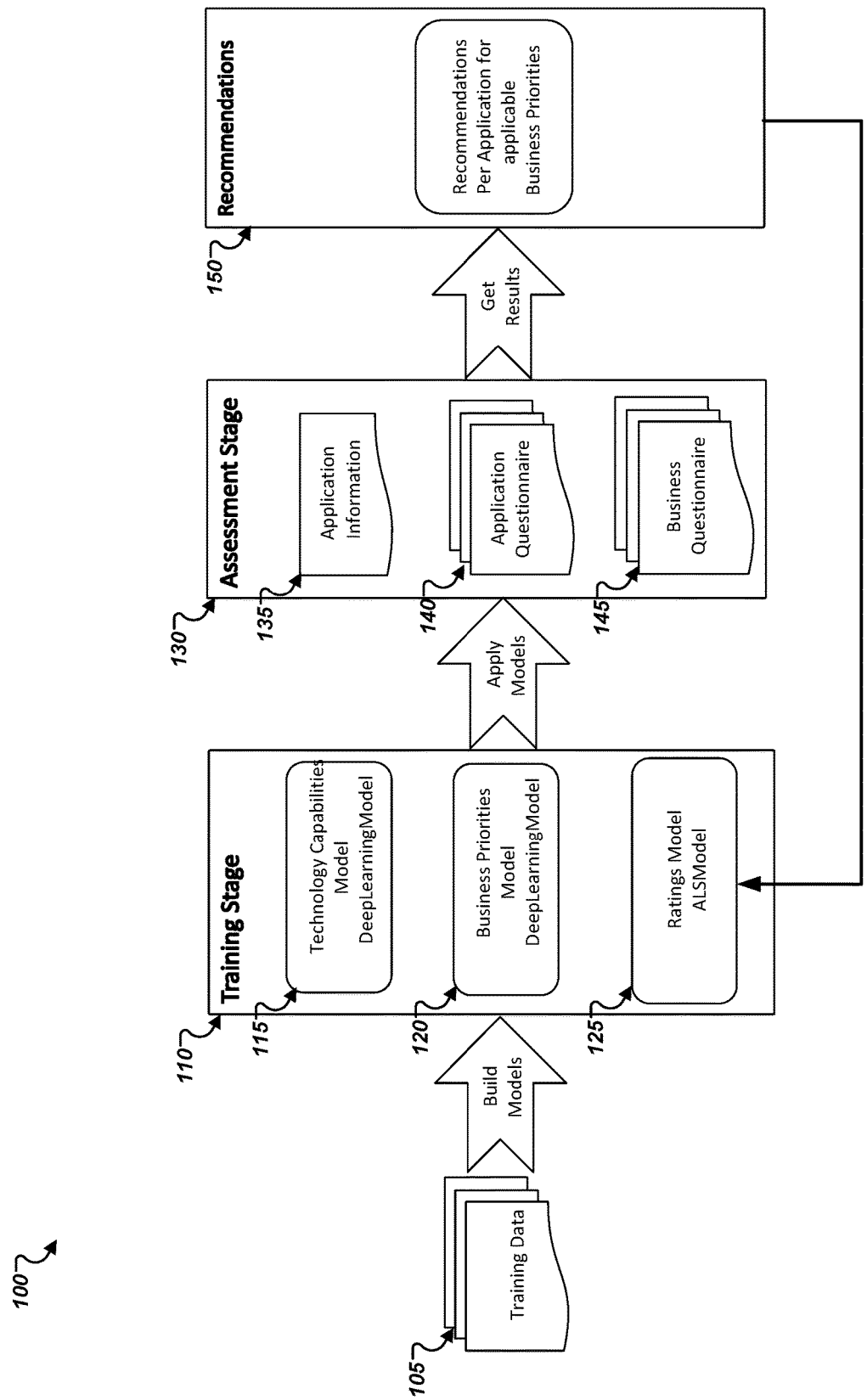
FIGS. 1 and 2 illustrate example systems that perform system modernization using machine learning.

FIG. 1 illustrates an example system 100 that performs system modernization (includes application modernization, application rationalization, application decommissioning and movement to cloud and digital i.e. social media, mobility, internet of things, artificial intelligence and analytics) using machine learning. Briefly, and as described in further detail below, the system 100 generates models that are configured to provide recommendations for modernization of system and applications based on a set of user provided input criteria, for example, answers to questionnaires. The questionnaires prompt a user for data related to the technical capabilities and business goals for each application being analyzed for updating and/or modernization. The system 100 provides the recommendations to the user and modifies the models based on whether the user accepts the recommendations. The system builds co-relations between business acceleration or innovation needs and technology capabilities and thereby identifies what technology capability uplift is required and also derives priorities based on their relative impact to business needs. In this manner, the system applies data and analytics to determine the best fit solution and provides visualizations so that the decision makers get full transparency into what drove a particular solution recommendation. The system also provides a Virtual Advisor that can interact with users over voice and answer their queries. Thereby the system implements the strategies of (1) Workforce Reimagined, e.g., the analysis and generation of recommendations is done by replacing Machine by Human and (2) Intelligent Enterprise where decisions are made based on analytics and insights as opposed to applying judgement.

These aspects are helpful when trying to drive collaboration between business and technology stakeholders because both the stakeholders have to agree or disagree based on data and facts as opposed to individual preferences. This thereby aids in accelerating modernization decision making and hence realization of the benefits. By providing voice based interaction capabilities through a virtual advisor, this system can now be used by either business or technology stakeholders or even senior leadership so that they can interactively be provided with insights and analytics to help them ratify the decisions and fine tune the same as appropriate. They can access the virtual advisor over a device of their choice at any time and from anywhere, thereby driving up customer service which could be impacted if a human isn't available to respond to the client's on time as even if available the human may need time to prepare with facts and figures for before interacting with such senior stakeholders.

In the example shown in FIG. 1, the system 100 generates training data 105. The training data 105 may fall into one of two groups. The first group of training data 105 is related to the technical capabilities of the system or application. The second group of training data 105 is related to the business imperatives of the system or application. The system 100 generates the technical capabilities training data by identifying a modernization or upgrade recommendation for different levels of each technology capability. Some example technology capabilities include accessibility, availability, currency, ease of data access, elasticity, extensibility, interoperability, scalability, security, and vendor reliance.

Accessibility is related to the ability for users with different visual, physical, or age-related limitations to be able to use the application. Availability is related to the ability for users to user the application from different locations such as at home or on a mobile device. Currency is related to the update level or "current-ness" of the application. The more up to date an application is relative to the current available version of the application, the higher the application's currency. Ease of data access may be related to the ability of the application to access data that is stored in different locations such as in the cloud, on a local server, or on a remote server. Elasticity is related to an applications ability to use an amount of processing power that is proportional to the user's request. An application with a high level of elasticity has the ability to use minimal processing power when the user inputs a small request and the ability to user more processing power when the user inputs a larger request. Extensibility is related to an application's ability to have new functionality extended, in which the application's internal structure and data flow are minimally or not affected, particularly that recompiling or changing the original source code is unnecessary when changing a system's behavior. Interoperability is related to the application's ability to operate with other applications. Scalability is related to the applications ability to process more data and allow more users access to the application while providing a similar level of functionality as when there are fewer users and less data. Security is related to the ability of the application to keep its data secure from unauthorized users. Vendor reliance is related to the level that a user or administrator must rely on the application vendor to provide support for the application. Vendor reliance may also be related to the level that the user may be tied to a particular vendor when using the application.

The system assigns recommendations to each technology capability on a scale of one to ten. Additionally, the system assigns recommendations based on technical debt. Technical debt refers to the eventual consequences of an application design within a code base. The debt can be thought of as work that needs to be done before a particular job can be considered complete or proper. Similar to financial debt, if the debt is not repaid, then it will accumulate interest. In this case, the more accumulated interest, the harder it is to make a change. For each technical debt level of low, medium, and high and a technology capability score between one and ten, the system assigns a recommendation. The results is a set of training data 105 that is related to the technical capabilities and that has thirty recommendations for each technology capability.

As noted above, the system also generates training data 105 that is related to the business imperatives of the system or application. Some example business imperatives include time to market, omni channel, data informed decision making, compliance, greater available functionality and mash ups, capture market share, improved client experience, increase share of wallet, accelerate client onboarding, or self-service features. In some implementations, the training data 105 that is related to the business imperatives of the system or application does not score each of the business imperatives and relate each score to a recommendation. Instead, the system 100 generates training data based on a recommendation's ability to solve one of the above business imperatives by ranking each of the recommendations. For example, the training data for the time to market business imperative may rank recommendation eleven as first, recommendation twelve as second, recommendation thirteen as third, recommendation twenty-one as fourth, etc.

The system 100 uses the training data 105 to build models at the training stage 110. In some implementations, the system 100 may not build two separate models, one for the technical capabilities and another for the business imperatives. Instead, the system 100 may train, using the training data described above, an processing model with two stages, the first being a technical capabilities stage 115 and the second being the business imperatives stage 120. In training the processing model, the system 100 derives a best fit solution for a problem with an application using the technical capabilities training data and supervised learning. The system 100 then derives the second stage by identifying, using the business imperatives training data, the recommendations that are most likely to solve the problem with the application. The training of these two stages is performed using supervised learning.

The processing model is a combination of specific processing steps and the training data. The system may be required to choose the technical classification and business imperative rating processes and combine them with the training data. Once the system 100 trains the processing model, the system 100 tests the model using a portion of the training data. If the deviations are too high then the system 100 chooses another process or fine tune the training data or both. The system 100 repeats this process until the system 100 identifies a combination of a process and a training data set that provides an acceptable deviation. The resulting processing model is used for prediction and rating in the system 100.

During the training process, the system 100 weights the parameters of the process in accordance with the training data. During the training process the system 100 constantly adjusts the parameters to ensure that the predictions, ratings, and recommendations will be correct in a majority of scenarios. To achieve this, the system 100 uses an underlying machine learning framework, for example, Apache Spark.

In some implementations, the training stage 110 also includes adding a ratings model stage 125 to the processing model. As will be described in detail below, the ratings model stage is trained using user feedback. For the initial training of the processing model, because there is no feedback for a particular user, the ratings model stage is not part of the processing model.

During training of the processing model, the system ensures that the solutions are granular enough so that there are not multiple problems for the same solution. In some implementations, even when there are some conflicts, the model is configured to only return one recommendation by deriving some regression between other parameters. In this way, during the training process the system 100 may ensure that any one of the technical parameters will precede the others while evaluating a range of recommendations for all parameters.

Due consideration is provided for client centricity as the user is allowed to configure the list of business priorities and technical capabilities though a default list of business priority and capabilities is pre-populated. The user is also allowed to prioritize business priorities and technical capabilities so that these priorities are baked into the recommendations and the ratings of the recommendations. The questionnaires are also configurable and additional questions may get added, modified or removed depending on the needs of the client. This ensures that the assessment is heavily personalized for a client ask and provides flexibility in responding to situations wherein client priorities may change. The look and feel and branding of the tool also changes based on the client to further personalize it. Thereby, the system implements the strategy of "Internet of Me" where in it is personalized and contextualized based on the user's need and asks and with due consideration for customer experience.

At the assessment stage 130, the system 100 analyzes the application to gather application information 135. Part of the analysis for the application may include determining the technical debt for an application. To determine the technical debt for an application, the system 100 determines the cyclomatic complexity, the coupling factor, the lack of cohesion of method, the attribute hiding factor, the method hiding factor, the lines of code, and the number of classes or files.

The cyclomatic complexity is a software metric that is used to indicate the complexity of a program. It is a quantitative measure of the number of linearly independent paths through a program's source code. The level of cyclomatic complexity is directly proportional to the amount of technical debt. The coupling factor measures the actual couplings among classes in relation to the maximum number of possible couplings. The coupling factor is directly proportional to the amount of technical debt. The lack of cohesion of methods indicates whether a class represents a single abstraction or multiple abstractions. The idea is that if a class represents more than one abstraction, it should be refactored into more than one class, each of which represents a single abstraction. The lack of cohesion of methods is directly proportional to the amount of technical debt. The method hiding factor and attribute hiding factor measures how variables and methods are encapsulated in a class. Visibility is counted in respect to other classes, and they represent the average amount of hiding among all classes in the system. Both are inversely proportional to the amount of technical debt. The lines of code represents the number of lines of source code for an application. The number of classes or files represent the number of classes or files in the source code of an application. Both are directly proportional to the amount of technical debt.

The system 100 generates questionnaires to elicit data for applying to the models. One of the questionnaires is an application questionnaire 140. FIG. 3 illustrates an example user interface 300 for an application questionnaire 140. The user interface 300 includes questions 305 that are related to the architecture of the data used by the application in question. Each question may be accompanied by a description 310 in instances where additional details may be helpful for the user to answer the question properly. Each question also includes a list of selectable responses 315. The user may select the appropriate response for each question from the selectable responses 315 and the answer appears in the answers column 320. The system 100 collects the answers for future processing. In some implementations, the application questionnaire 140 is specific for each application. In other words, the user has to fill out a different application questionnaire for each application to be reviewed by the system 100. In some implementations, the technical capabilities questionnaire, or application questionnaire 140, is split into two tabs, e.g., one that focuses on the technical architecture and the other that focuses on the application characteristics. Also included may be an introduction tab that prompts the user about the applications overview, owners, etc. Separating the technical architecture tab allows the user to reuse the answers from the particular tab for other questionnaires for other applications. In this regard, the system may permit the user to reuse answers from previous questionnaires.

Another of the questionnaires is a business questionnaire 145. Similar to application questionnaire 140 as shown in user interface 300, the business questionnaire 145 provides the user with questions and selectable answers. For the business questionnaire 145, the questions are related to the business imperatives of the application. The business questionnaire 145 may have similar characteristics to the technical capabilities questionnaire 140 such as allowing the user to copy answers from other questionnaires and splitting each questionnaire into different tabs.

The system 100 applies the models to the questionnaire answers and generates recommendations 150 to modernize the application. As a first step in applying the models, the system 100 generates score for each of the technical capabilities listed above based on the answers to the technical questionnaire 140. The system maps the answers from the technical questionnaire 140 to the technical capabilities on a scale of one to ten. The system 100 then uses the score to identify the appropriate recommendations. The system 100 may also compare the recommendations to the answers from the business questionnaire to ensure that the concerns of the user are addressed by the recommendations As an example, the user may provide answers to the technical questionnaire 140. Based on those answers, the system 100 scores the answers and generates recommendations that improve the interoperability and ease of access for the application. The system 100 may confirm that this is an appropriate recommendation by identifying answers in the business questionnaire 145 that suggests that time to market is a concern for the user. If the system 100 does not confirm that the recommendation is appropriate, then the user may be notified of a conflict between the technical aspects of the application and the business aspects of the application.

In some implementations, the system 100 may be applying the models to the questionnaire data and determine that the recommendations are not appropriate. The system 100 may be notified of this because a number of conflicts between the technical aspects of the application and the business aspects of the application is above a threshold and the discrepancy is too high to be caused by conflicting questionnaire answers. The system 100 may also be notified of this if the user does not accept at least a threshold number of recommendations. In either of these instances, the system 100 may select a different process to build the model or select different training data.

In some implementations, the user, through the questionnaires may select weights to apply to each technical questionnaire. The system adjusts the scores for each of the technical capabilities according to the weights received from the user. A higher weight from the user causes the system 100 to adjust the score by a greater amount. By adjusting the weight to a higher level, the user is implying that a particular technical capability is important to the user. Based on the scales for the technical capabilities, a lower number implies that the application has a less technical capability for that category and thus more need for modernization. Adjusting a score with a higher weight decreases the score by a greater amount than adjusting a score with a lower weight.

The system 100 applies the model and focuses on the technical parameters with the lower ratings first. Therefore, if any technical capabilities have been weighted heavily by the user, the system 100 will address those near the beginning, or if a technical capability has a low score even without extra weight, then the system will address that near the beginning also. This may be the desired functionality of the system 100 by the user because the system 100 should focus on the technical shortcomings of the application as well as those technical capabilities weighted heavily by the user. In some implementations, the system 100 factors in technical debt to identify the recommendations. For example, the system 100 may have a particular recommendation if the security score is two and the technical debt is low and a different recommendation if the security score is two and the technical debt is high.

Using the model, the system 100 selects the best fit solution and presents the user with the suggested recommendations 150 to modernize the application. For a given application problem, there will be one selected solution. For example, with respect to elasticity, there are not multiple solutions for the problem. The solution may be rehost the application on an internal server, a public server, a private server, a community server, or a hybrid cloud server.

In some implementations, the system 100 returns inaccurate recommendations 150 and yet still returns a unique recommendation for each problem. In this instance, the system 100 may receive frequent overrides from the user or a large amount of inaccurate recommendations. The system 100 may use supervised learning to adjust and retrain the model. As will now be described, the ratings model may be trained as feedback is received from the user.

Figure 4:
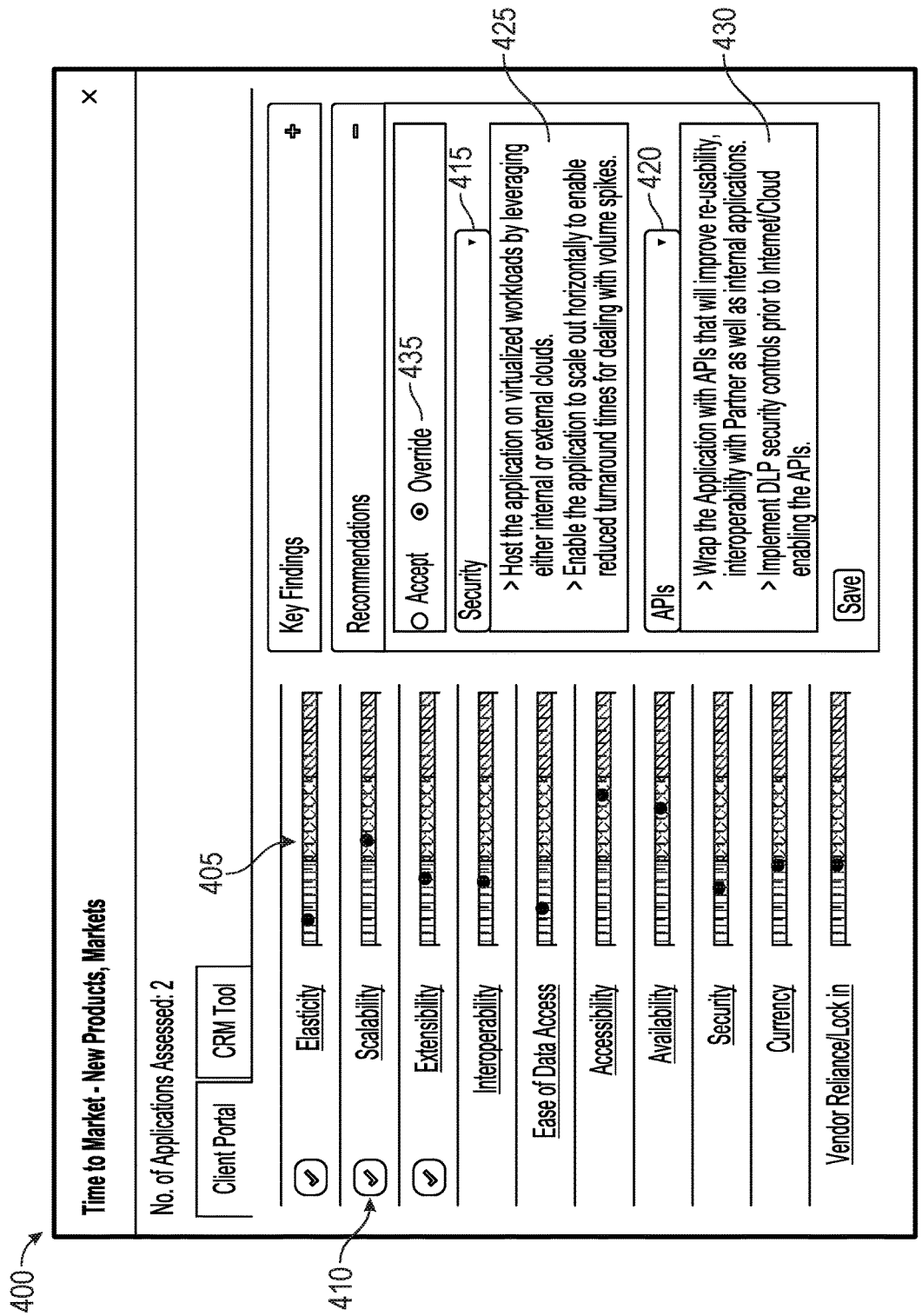

The system 100 will modify the ratings model 125 based on the feedback from the user. As illustrated in the example user interface 400 of FIG. 4, the user may override recommendations provided by the system 100. In user interface 400, each of the technical capabilities includes a score shown on a line graph. In this example, some of the lowest scores are for elasticity and ease of data access. The user may also check some of the important technical capabilities using selection items 410. Using drop down menu 415, the user may select the recommendation category. Using drop down menu 420, the user may select the recommendation sub-category. Some example recommendation categories include movement to cloud/virtual machines, movement to x86, APIs, analytics/data lakes, front ends, security, replacement of obsolete layers/upgrade, replacement with SaaS/package, or replacement with open source. Below the drop down menus 415 and 420, the user interface 400 includes the recommendations 425 and 430. The user selects accept or override from the radio buttons 435 to accept or override the recommendation.

Once the system 100 receives the user's selections of the recommendations 150, the system 100 updates the ratings model 125. For example, if the user is reluctant to accept a recommendation related to replacement with open source, then the system 100 may update the ratings model 125 to decrease the likelihood of the system 100 recommending replacement with open source. If the user demonstrates a high acceptance rate for movement to cloud/virtual machines, then the system may update the ratings model 125 to increase the likelihood of the system 100 recommending movement to cloud/virtual machines. The updated ratings model 125 may be used when the system 100 analyses additional applications for the user.

Figure 2:
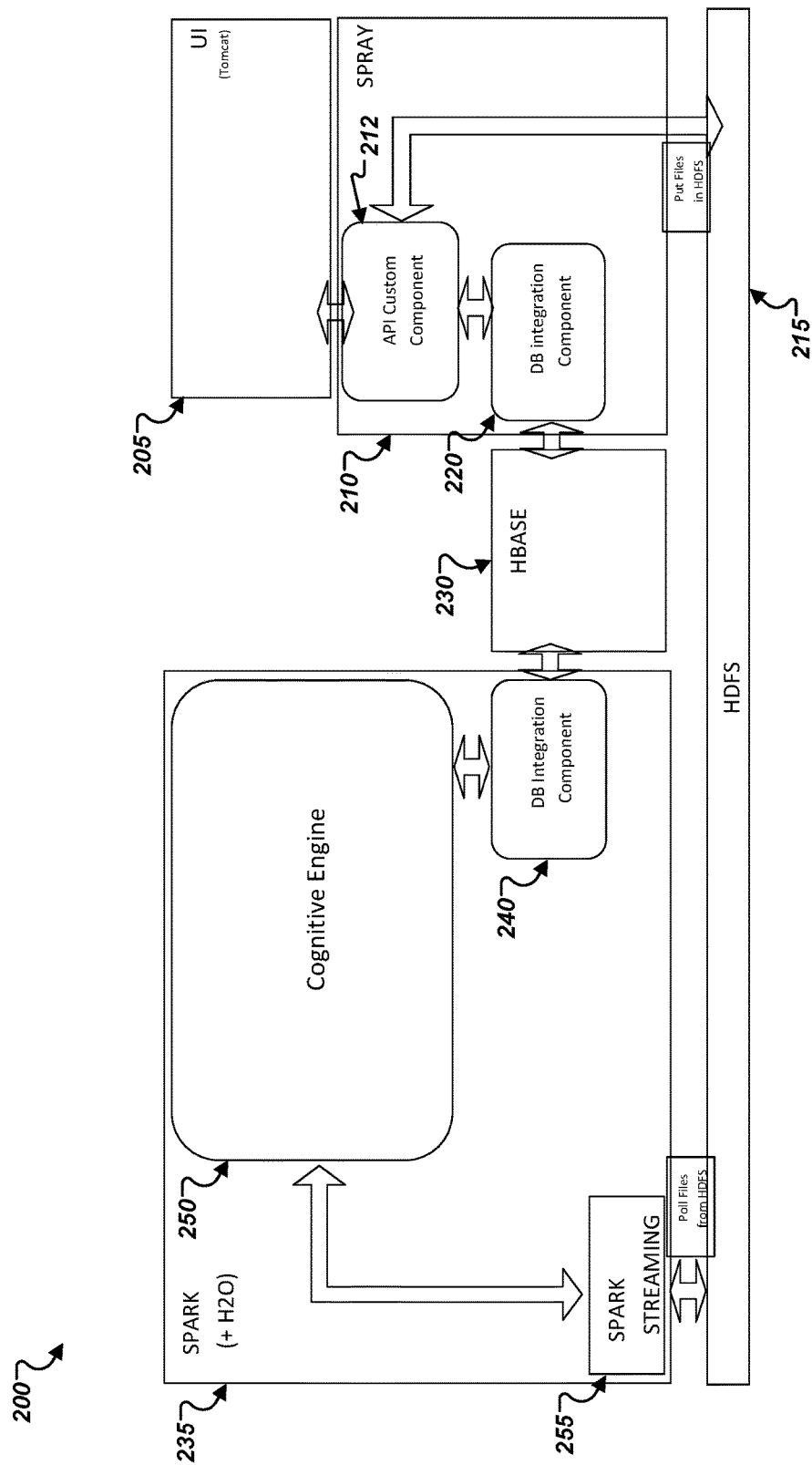

FIG. 2 illustrates an example system 200 that performs system modernization using machine learning. The example system 200 illustrates the relationship between various processing, storage, and user interface components that are used to provide modernization recommendations.

The system 200 includes a user interface component 205. The user interface component 205 may be configured to display the user interfaces 300 and 400. The user interface component 205 may be configured to display the user interfaces on any type of computing devices including desktop computers, laptop computers, tablets, mobile phones, or wearable devices. As an example, the user interface component 205 may be configured using Apache Tomcat. The user interface component 205 (e.g., SPRAY) may communicate with an input/output module 210 using an API component 212. The input/output module may use the API component 212 to place files into a Hadoop distributed file system (HDFS) 215. The input/output module 210 may also use a database integration component 220 to place data into the distributed database 230 (e.g., Apache HBase). The input/output module 210 may place data from the questionnaires and feedback data into the distributed database 230.

The distributed database 230 communicates with an open source computing cluster 235 (e.g., Apache Spark) using the database integration component 240 of the open source computing cluster 235. The open source computing cluster 235 includes a cognitive engine 250 that generates the models and applies the models to the questionnaire answers. The open source computing cluster 235 includes a streaming module 255 to store and access data from the Hadoop distributed file system (HDFS) 215. The infrastructure may be based on Apache YARN and MESOS which allows the system to distribute the data sets across multiple data centers and thereby process large volumes of data at speed in order to generate insights and recommendations.

Figure 5:
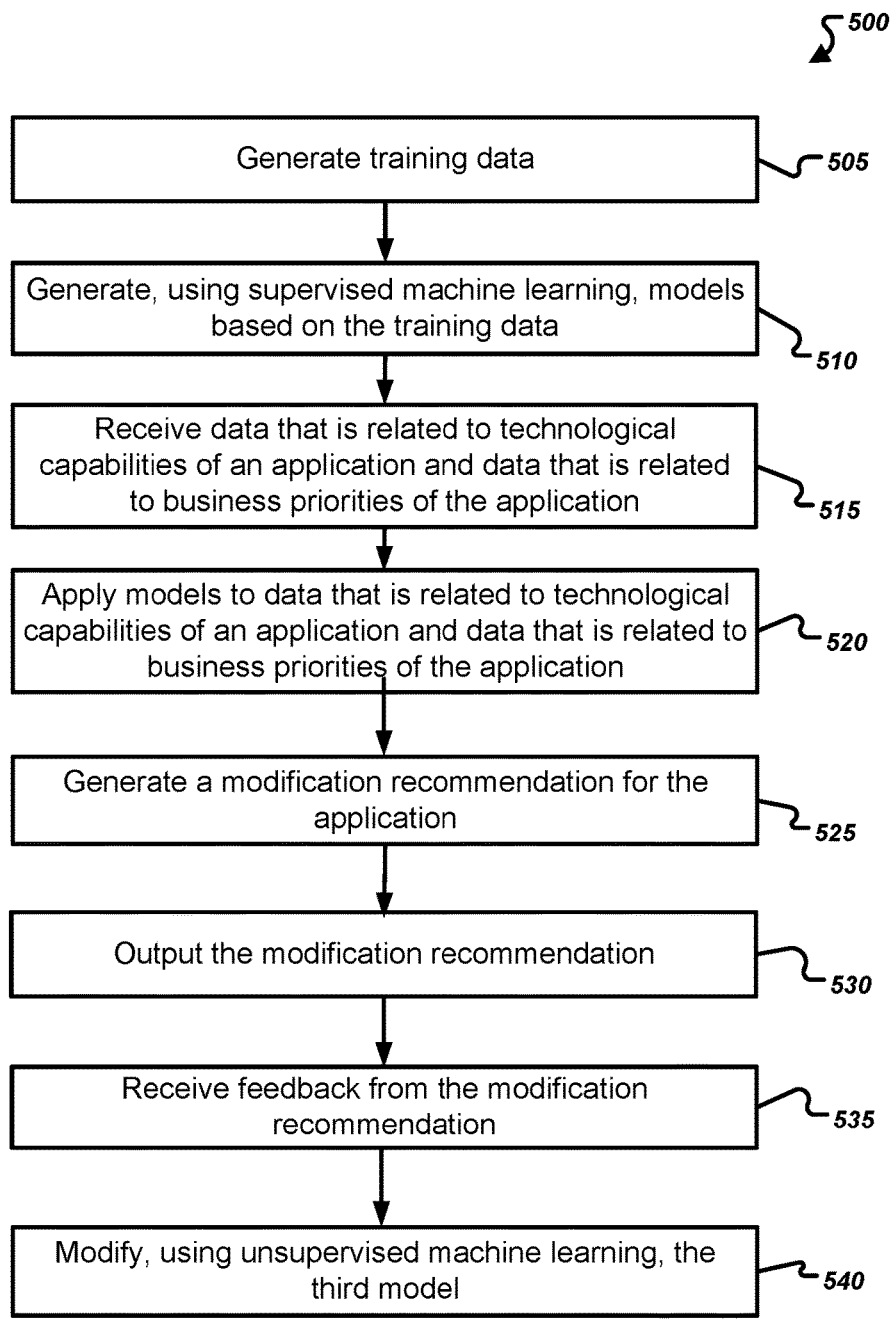
FIG. 5 illustrates an example process for performing system modernization using machine learning.

FIG. 5 illustrates an example process 500 for performing system modernization using machine learning. In general, the process 500 processes generates different models to apply to user provided data. The process 500 generates recommendations regarding system and application modernization based on the output from the models. The process 500 will be described as being performed by a computer system comprising one or more computers, for example, the systems 100 or 200 as shown in FIG. 1 or 2.

The system generates training data (505). In some implementations, generating the training data include analyzing a plurality of applications. For example, the system may use data gathered from previously analyzed application. The system generates modification recommendations for each of the plurality of applications. The system generates, independent of any feedback data, training data based on analyzing the plurality of applications and generating the modification recommendations for each of the plurality of applications.

Based on the training data and using supervised machine learning, the system generates a first model, a second model, and a third model (510). In some implementations, the first model is a technology capabilities model that is configured to provide recommendations based on technical functions of the application, the second model is a business priorities model that is configured to provide recommendations based on business goals of the application, and the third model is a ratings model that is configured to modify recommendations based on prior feedback. In some implementations, the system does not generate the third model until the system receives feedback from the user for whom the system analyzes the application. In some implementations, the system generates a single model that is based on technical functions of the application.

The system receives data that is related to technological capabilities of an application and data that is related to business priorities of the application (515). In some implementations, the system provides, for output, one or more technological capabilities prompts that are configured to elicit a technical function response from a user; and provides, for output, one or more business priorities prompts that are configured to elicit a business goal response from the user. For example, the system provides questionnaires that allow the user to answer technology and business questions related to an application. In some implementations, the technological capabilities include elasticity, scalability, extensibility, interoperability, ease of data access, accessibility, availability, security, currency, or vendor reliance. In some implementations, the business goals of the application include time to market, omni channel, data informed decision making, compliance, greater available functionality and mash ups, capture market share, improved client experience, increase share of wallet, accelerate client onboarding, or self-service features.

The system applies the first model to the data that is related to the technological capabilities of the application and the second model to the data that is related to business priorities of the application (520). In some implementation the system applies the first model to the data and weights the data output from the first model based on the business goal responses from the user.

Based on applying the first model and the second model, the system generates a modification recommendation for the application (525). In some implementations, the system generates the modification recommendation based on the technical debt of the application. They system generates technical debt measurement based on cyclomatic complexity, coupling factor, lack of cohesion of methods, attribute hiding factor, method hiding factor, lines of code, or number of classes or files. In some implementations, the system generates recommendations based on the effects that the application may have on system performance. For example, an application may be causing the system that the application is running on to consume a majority of the systems resources, e.g., processor time or memory, on executing the application. As another example, the application may be causing the system to use the majority of the bandwidth of the network to which the system is connected. The system may recommend application modifications that improve processor usage, memory usage, or network bandwidth usage.

The system provides, for output, the modification recommendation for the application (530). The system receives feedback data that indicates a level of acceptance of the modification recommendation for the application (535). In some implementations, the feedback data includes either an acceptance or a rejection of the modification recommendation.

Based on the feedback data that indicates the level of acceptance of the modification recommendation for the application, the system modifies, using unsupervised machine learning, the third model (540). In some implementations, the third model has not been generated because the system has not analyzed an application previously for the user. In this instance, the system generates the third model based on the feedback. The system may use the third model for future recommendations. For example, using the third model may cause the system to be more likely to provide a recommendation that the user previously accepted and cause the system to be less likely to provide a recommendation that the user previously rejected.

Figure 6:
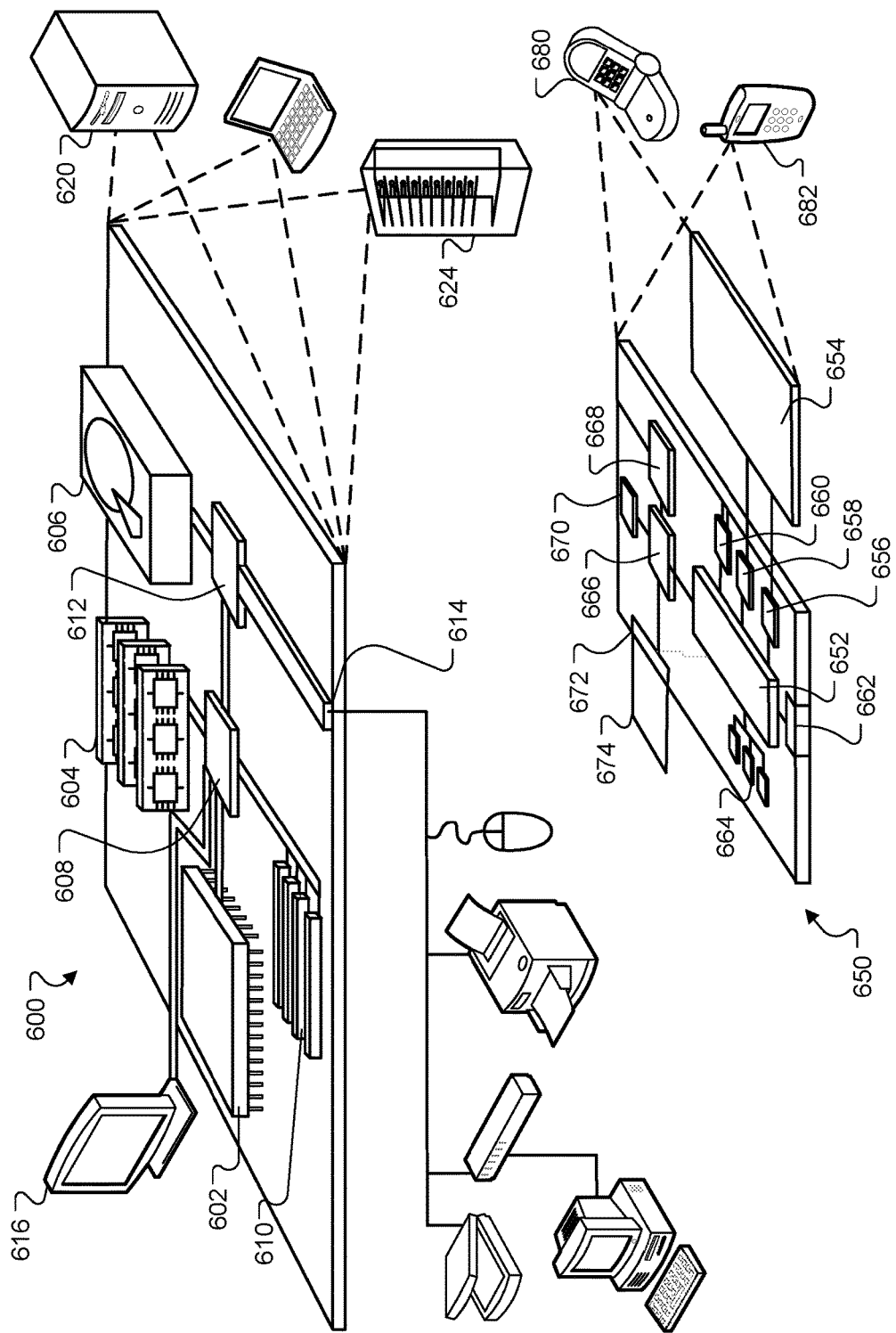
FIG. 6 illustrates an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards. In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device, such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver. In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
generating training data including (i) a first set of training data that indicates technical capabilities of an application, and (ii) a second set of training data that indicates one or more business imperatives of the application;
training, using supervised machine learning, a processing model for generating modification recommendations for applications, the processing model having (i) a technical capabilities stage that is trained to provide recommendations based on technical functions of applications using the first set of training data that indicates the technical capabilities of the application and that is trained independent of feedback data concerning prior generated modification recommendations, and (ii) a business imperatives stage that is trained to provide recommendations based on business goals of applications using the second set of training data that indicates the one or more business imperatives of the application;
receiving first user-input data that is derived from a questionnaire relating to technological capabilities of the application and second user-input data that is derived from a questionnaire relating to business imperatives of the application;
applying (i) the technical capabilities stage of the processing model to the first user-input data that is derived from the questionnaire relating to the technological capabilities of the application, and (ii) the business imperatives stage of the processing model to the second user-input data that is derived from the questionnaire relating to the business imperatives of the application;
based on applying the technical capabilities stage of the processing model to the first user-input data and applying the business imperatives stage of the processing model to the second user-input data, generating a modification recommendation for the application;
providing, for output, the modification recommendation for the application;
receiving feedback data that indicates a level of acceptance of the modification recommendation for the application;
training, using unsupervised machine learning, a ratings stage of the processing model using the feedback data that indicates the level of acceptance of the modification recommendation for the application as training data; and
using the technical capabilities stage, the business imperatives stage, and the ratings stage of the processing model in generating a modification recommendation for a different application.

2. The method of claim 1, wherein generating training data comprises:
analyzing a plurality of applications;
generating modification recommendations for each of the plurality of applications; and
generating, independent of any feedback data, the training data based on analyzing the plurality of applications and generating the modification recommendations for each of the plurality of applications.

3. The method of claim 1, comprising:
determining technical debt for the application, wherein the technical debt is based on one or more of cyclomatic complexity, coupling factor, lack of cohesion of methods, attribute hiding factor, method hiding factor, lines of code, and number of classes or files,
wherein the modification recommendation for the application is further based on the technical debt for the application.

4. The method of claim 1, wherein receiving the first user-input data comprises:
providing, for output, one or more technological capabilities prompts that are configured to elicit a technical function response from a user; and
providing, for output, one or more business priorities prompts that are configured to elicit a business goal response from the user.

5. The method of claim 1, wherein the technical capabilities of the application comprise elasticity, scalability, extensibility, interoperability, ease of data access, accessibility, availability, security, currency, and vendor reliance.

6. The method of claim 1, wherein the business imperatives of the application comprise time to market, omni channel, data informed decision making, compliance, greater available functionality and mash ups, capture market share, improved client experience, increase share of wallet, accelerate client onboarding, and self-service features.

7. The method of claim 1, wherein using the technical capabilities stage, the business imperatives stage, and the ratings stage of the processing model in generating a modification recommendation for a different application comprises:
receiving data that is related to technological capabilities of an additional application and data that is related to business imperatives of the additional application;
applying the technical capabilities stage of the processing model to the data that is related to the technological capabilities of the additional application and the business imperatives stage of the processing model to the data that is related to business imperatives of the additional application;
based on applying the technical capabilities stage of the processing model and the business imperatives stage of the processing model, generating an additional modification recommendation for the additional application;
generating an adjusted additional modification recommendation by applying the ratings stage of the processing model to the additional modification recommendation for the additional application;
providing, for output, the adjusted additional modification recommendation for the additional application;
receiving additional feedback data that indicates an additional level of acceptance of the adjusted additional modification recommendation for the additional application; and
based on the additional feedback data that indicates the additional level of acceptance of the adjusted additional modification recommendation for the additional application, modifying, using unsupervised machine learning, the ratings stage of the processing model.

8. A system comprising:
one or more computers and one or more storage devices storing instructions that are operable, when executed by the one or more computers, to cause the one or more computers to perform operations comprising:
generating training data including (i) a first set of training data that indicates technical capabilities of an application, and (ii) a second set of training data that indicates one or more business imperatives of the application;
training, using supervised machine learning, a processing model for generating modification recommendations for applications, the processing model having (i) a technical capabilities stage that is trained to provide recommendations based on technical functions of applications using the first set of training data that indicates the technical capabilities of the application and that is trained independent of feedback data concerning prior generated modification recommendations, and (ii) a business imperatives stage that is trained to provide recommendations based on business goals of applications using the second set of training data that indicates the one or more business imperatives of the application;

receiving first user-input data that is derived from a questionnaire relating to technological capabilities of the application and second user-input data that is derived from a questionnaire relating to business imperatives of the application;

applying (i) the technical capabilities stage of the processing model to the first user-input data that is derived from the questionnaire relating to the technological capabilities of the application, and (ii) the business imperatives stage of the processing model to the second user-input data that is derived from the questionnaire relating to the business imperatives of the application;

based on applying the technical capabilities stage of the processing model to the first user-input data and applying the business imperatives stage of the processing model to the second user-input data, generating a modification recommendation for the application;

providing, for output, the modification recommendation for the application;

receiving feedback data that indicates a level of acceptance of the modification recommendation for the application;

training, using unsupervised machine learning, a ratings stage of the processing model using the feedback data that indicates the level of acceptance of the modification recommendation for the application as training data; and using the technical capabilities stage, the business imperatives stage, and the ratings stage of the processing model in generating a modification recommendation for a different application.

9. The system of claim 8, wherein generating training data comprises:

analyzing a plurality of applications;

generating modification recommendations for each of the plurality of applications; and generating, independent of any feedback data, the training data based on analyzing the plurality of applications and generating the modification recommendations for each of the plurality of applications.

10. The system of claim 8, wherein the operations further comprise:

determining technical debt for the application, wherein the technical debt is based on one or more of cyclomatic complexity, coupling factor, lack of cohesion of methods, attribute hiding factor, method hiding factor, lines of code, and number of classes or files, wherein the modification recommendation for the application is further based on the technical debt for the application.

11. The system of claim 8, wherein receiving the first user-input data comprises:

providing, for output, one or more technological capabilities prompts that are configured to elicit a technical function response from a user; and providing, for output, one or more business priorities prompts that are configured to elicit a business goal response from the user.

12. The system of claim 8, wherein the technical capabilities of the application comprise elasticity, scalability, extensibility, interoperability, ease of data access, accessibility, availability, security, currency, and vendor reliance.

13. The system of claim 8, wherein the business imperatives of the application comprise time to market, omni channel, data informed decision making, compliance, greater available functionality and mash ups, capture market share, improved client experience, increase share of wallet, accelerate client onboarding, self-service features.

14. The system of claim 8, wherein using the technical capabilities stage, the business imperatives stage, and the ratings stage of the processing model in generating a modification recommendation for a different application comprises:

receiving data that is related to technological capabilities of an additional application and data that is related to business imperatives of the additional application;

applying the technical capabilities stage of the processing model to the data that is related to the technological capabilities of the additional application and the business imperatives stage of the processing model to the data that is related to business imperatives of the additional application;

based on applying the technical capabilities stage of the processing model and the business imperatives stage of the processing model, generating an additional modification recommendation for the additional application;

generating an adjusted additional modification recommendation by applying the ratings stage of the processing model to the additional modification recommendation for the additional application;

providing, for output, the adjusted additional modification recommendation for the additional application;

receiving additional feedback data that indicates an additional level of acceptance of the adjusted additional modification recommendation for the additional application; and based on the additional feedback data that indicates the additional level of acceptance of the adjusted additional modification recommendation for the additional application, modifying, using unsupervised machine learning, the ratings stage of the processing model.

15. A non-transitory computer-readable medium storing software comprising instructions executable by one or more computers which, upon such execution, cause the one or more computers to perform operations comprising:

generating training data including (i) a first set of training data that indicates technical capabilities of an application, and (ii) a second set of training data that indicates one or more business imperatives of the application;

training, using supervised machine learning, a processing model for generating modification recommendations for applications, the processing model having (i) a technical capabilities stage that is trained to provide recommendations based on technical functions of applications using the first set of training data that indicates the technical capabilities of the application and that is trained independent of feedback data concerning prior generated modification recommendations, and (ii) a business imperatives stage that is trained to provide recommendations based on business goals of applications using the second set of training data that indicates the one or more business imperatives of the application;

receiving first user-input data that is derived from a questionnaire relating to technological capabilities of the application and second user-input data that is derived from a questionnaire relating to business imperatives of the application;

applying (i) the technical capabilities stage of the processing model to the first user-input data that is derived from the questionnaire relating to the technological capabilities of the application, and (ii) the business imperatives stage of the processing model to the second user-input data that is derived from the questionnaire relating to the business imperatives of the application;

based on applying the technical capabilities stage of the processing model to the first user-input data and applying the business imperatives stage of the processing model to the second user-input data, generating a modification recommendation for the application;

providing, for output, the modification recommendation for the application;

receiving feedback data that indicates a level of acceptance of the modification recommendation for the application;

training, using unsupervised machine learning, a ratings stage of the processing model using the feedback data that indicates the level of acceptance of the modification recommendation for the application as training data; and using the technical capabilities stage, the business imperatives stage, and the ratings stage of the processing model in generating a modification recommendation for a different application.

16. The medium of claim 15, wherein generating training data comprises:

analyzing a plurality of applications;

generating modification recommendations for each of the plurality of applications; and generating, independent of any feedback data, the training data based on analyzing the plurality of applications and generating the modification recommendations for each of the plurality of applications.

17. The medium of claim 15, wherein the operations further comprise:

determining technical debt for the application, wherein the technical debt is based on one or more of cyclomatic complexity, coupling factor, lack of cohesion of methods, attribute hiding factor, method hiding factor, lines of code, and number of classes or files, wherein the modification recommendation for the application is further based on the technical debt for the application.

18. The medium of claim 15, wherein using the technical capabilities stage, the business imperatives stage, and the ratings stage of the processing model in generating a modification recommendation for a different application comprises:

receiving data that is related to technological capabilities of an additional application and data that is related to business imperatives of the additional application;

applying the technical capabilities stage of the processing model to the data that is related to the technological capabilities of the additional application and the business imperatives stage of the processing model to the data that is related to business imperatives of the additional application;

based on applying the technical capabilities stage of the processing model and the business imperatives stage of the processing model, generating an additional modification recommendation for the additional application;

generating an adjusted additional modification recommendation by applying the ratings stage of the processing model to the additional modification recommendation for the additional application;

providing, for output, the adjusted additional modification recommendation for the additional application;

receiving additional feedback data that indicates an additional level of acceptance of the adjusted additional modification recommendation for the additional application; and based on the additional feedback data that indicates the additional level of acceptance of the adjusted additional modification recommendation for the additional application, modifying, using unsupervised machine learning, the ratings stage of the processing model.

* * * * *